Aug. 30, 1966 G. B. STRAWBRIDGE 3,270,318

ADDRESS CHECKING DEVICE

Filed March 27, 1961 5 Sheets-Sheet 1

INVENTOR
GEORGE B. STRAWBRIDGE

BY Griffin and Stokes
ATTORNEYS

Aug. 30, 1966 G. B. STRAWBRIDGE 3,270,318

ADDRESS CHECKING DEVICE

Filed March 27, 1961 5 Sheets-Sheet 2

Aug. 30, 1966 G. B. STRAWBRIDGE 3,270,318

ADDRESS CHECKING DEVICE

Filed March 27, 1961 5 Sheets-Sheet 3

FIG. 4

| LINE ADDRESS | | | BUSS ADDRESS | | | | | | | | |
|---|---|---|---|---|---|---|---|---|---|---|---|
| COORDINATE LINE (n) | SIGN OF PARITY | ADDRESS | n+1 | n+2 | n+3 | n+4 | n+5 | n+6 | n+7 | n+8 | COORDINATE LINE |
| | | | MOX | MEX | MOX | MEX | MOX | MEX | MOX | MEX | SEL. MATRIX |
| | | | + | — | — | + | + | — | — | + | SIGN OF PARITY |
| | | | 0 | 1 | 2 | 3 | 5 | 4 | 7 | 6 | ADDRESS |
| 0 | + | 0 | 00 + | 01 — | 02 — | 03 + | 05 + | 04 — | 07 — | 06 + | |
| 8 | + | 3 | 30 + | 31 — | 32 — | 33 + | 35 + | 34 — | 37 — | 36 + | |
| 16 | + | 5 | 50 + | 51 — | 52 — | 53 + | 55 + | 54 — | 57 — | 56 + | |
| 24 | + | 6 | 60 + | 61 — | 62 — | 63 + | 65 + | 64 — | 67 — | 66 + | |
| | | | — | + | + | — | — | + | + | — | SIGN OF PARITY |
| | | | 7 | 6 | 5 | 4 | 2 | 3 | 0 | 1 | ADDRESS |
| 32 | — | 1 | 17 + | 16 — | 15 — | 14 + | 12 + | 13 — | 10 — | 11 + | |
| 40 | — | 2 | 27 + | 26 — | 25 — | 24 + | 22 + | 23 — | 20 — | 21 + | |
| 48 | — | 4 | 47 + | 46 — | 45 — | 44 + | 42 + | 43 — | 40 — | 41 + | |
| 56 | — | 7 | 77 + | 76 — | 75 — | 74 + | 72 + | 73 — | 70 — | 71 + | |

X COORDINATE ADDRESS TABULATION

FIG. 5

| LINE ADDRESS | | | BUSS ADDRESS | | | | | | | | |
|---|---|---|---|---|---|---|---|---|---|---|---|
| COORDINATE LINE (n) | SIGN OF LINE PARITY | LINE ADDRESS | n+1 | n+2 | n+3 | n+4 | n+5 | n+6 | n+7 | n+8 | COORDINATE LINE |
| | | | MOY | MEY | MOY | MEY | MOY | MEY | MOY | MEY | SEL. MATRIX |
| | | | + | + | — | — | + | + | — | — | SIGN OF BUSS PARITY |
| | | | 0 | 3 | 1 | 2 | 5 | 6 | 4 | 7 | BUSS ADDRESS |
| 0 | + | 0 | 00 + | 03 + | 01 — | 02 — | 05 + | 06 + | 04 — | 07 — | |
| 8 | + | 3 | 30 + | 33 + | 31 — | 32 — | 35 + | 36 + | 34 — | 37 — | |
| 16 | + | 5 | 50 + | 53 + | 51 — | 52 — | 55 + | 56 + | 54 — | 57 — | |
| 24 | + | 6 | 60 + | 63 + | 61 — | 62 — | 65 + | 66 + | 64 — | 67 — | |
| | | | — | — | + | + | — | — | + | + | SIGN OF BUSS PARITY |
| | | | 4 | 7 | 5 | 6 | 1 | 2 | 0 | 3 | BUSS ADDRESS |
| 32 | — | 1 | 14 + | 17 + | 15 — | 16 — | 11 + | 12 + | 10 — | 13 — | |
| 40 | — | 2 | 24 + | 27 + | 25 — | 26 — | 21 + | 22 + | 20 — | 23 — | |
| 48 | — | 4 | 44 + | 47 + | 45 — | 46 — | 41 + | 42 + | 40 — | 43 — | |
| 56 | — | 7 | 74 + | 77 + | 75 — | 76 — | 71 + | 72 + | 70 — | 73 — | |

Y COORDINATE ADDRESS TABULATION

Aug. 30, 1966 G. B. STRAWBRIDGE 3,270,318

ADDRESS CHECKING DEVICE

Filed March 27, 1961 5 Sheets-Sheet 4

FIG. 6

| ADDRESS | | BUSS ADDRESS 1 | | | 3 | | | 4 | | | 6 | | |
|---|---|---|---|---|---|---|---|---|---|---|---|---|---|
| PARITY SIGN | | - | | | + | | | - | | | + | | |
| LINE ADDRESS: ADDRESS | PARITY SIGN | ADDRESS | LINE | PARITY SIGN | ADDRESS | LINE | PARITY SIGN | ADDRESS | LINE | PARITY SIGN | ADDRESS | LINE | PARITY SIGN |
| 0 | + | 01 | 2 | - | 03 | 4 | + | 04 | 6 | - | 06 | 8 | + |
| 3 | + | 31 | 10 | - | 33 | 12 | + | 34 | 14 | - | 36 | 16 | + |
| 5 | + | 51 | 18 | - | 53 | 20 | + | 54 | 22 | - | 56 | 24 | + |
| 6 | + | 61 | 26 | - | 63 | 28 | + | 64 | 30 | - | 66 | 32 | + |
| 1 | - | 11 | 40 | + | 13 | 38 | - | 14 | 36 | + | 16 | 34 | - |
| 2 | - | 21 | 48 | + | 23 | 46 | - | 24 | 44 | + | 26 | 42 | - |
| 4 | - | 41 | 56 | + | 43 | 54 | - | 44 | 52 | + | 46 | 50 | - |
| 7 | - | 71 | 64 | + | 73 | 62 | - | 74 | 60 | + | 76 | 58 | - |

TABULATION FOR SEL. MATRIX MEX

FIG. 7

| ADDRESS | | BUSS ADDRESS 0 | | | 2 | | | 5 | | | 7 | | |
|---|---|---|---|---|---|---|---|---|---|---|---|---|---|
| PARITY SIGN | | + | | | - | | | + | | | - | | |
| LINE ADDRESS: ADDRESS | PARITY SIGN | ADDRESS | LINE | PARITY SIGN | ADDRESS | LINE | PARITY SIGN | ADDRESS | LINE | PARITY SIGN | ADDRESS | LINE | PARITY SIGN |
| 0 | + | 00 | 1 | + | 02 | 3 | - | 05 | 5 | + | 07 | 7 | - |
| 3 | + | 30 | 9 | + | 32 | 11 | - | 35 | 13 | + | 37 | 15 | - |
| 5 | + | 50 | 17 | + | 52 | 19 | - | 55 | 21 | + | 57 | 23 | - |
| 6 | + | 60 | 25 | + | 62 | 27 | - | 65 | 29 | + | 67 | 31 | - |
| 1 | - | 10 | 39 | - | 12 | 37 | + | 15 | 35 | - | 17 | 33 | + |
| 2 | - | 20 | 47 | - | 22 | 45 | + | 25 | 43 | - | 27 | 41 | + |
| 4 | - | 40 | 55 | - | 42 | 53 | + | 45 | 51 | - | 47 | 49 | + |
| 7 | - | 70 | 63 | - | 72 | 61 | + | 75 | 59 | - | 77 | 57 | + |

TABULATION FOR SEL. MATRIX MOX

FIG. 8

| ADDRESS | | BUSS ADDRESS 0 | | | 1 | | | 5 | | | 4 | | |
|---|---|---|---|---|---|---|---|---|---|---|---|---|---|
| PARITY SIGN | | + | | | - | | | + | | | - | | |
| LINE ADDRESS: ADDRESS | PARITY SIGN | ADDRESS | LINE | PARITY SIGN | ADDRESS | LINE | PARITY SIGN | ADDRESS | LINE | PARITY SIGN | ADDRESS | LINE | PARITY SIGN |
| 0 | + | 00 | 1 | + | 01 | 3 | - | 05 | 5 | + | 04 | 7 | - |
| 3 | + | 30 | 9 | + | 31 | 11 | - | 35 | 13 | + | 34 | 15 | - |
| 5 | + | 50 | 17 | + | 51 | 19 | - | 55 | 21 | + | 54 | 23 | - |
| 6 | + | 60 | 25 | + | 61 | 27 | - | 65 | 29 | + | 64 | 31 | - |
| 1 | - | 10 | 39 | - | 11 | 37 | + | 15 | 35 | - | 14 | 33 | + |
| 2 | - | 20 | 47 | - | 21 | 45 | + | 25 | 43 | - | 24 | 41 | + |
| 4 | - | 40 | 55 | - | 41 | 53 | + | 45 | 51 | - | 44 | 49 | + |
| 7 | - | 70 | 63 | - | 71 | 61 | + | 75 | 59 | - | 74 | 57 | + |

TABULATION FOR SEL. MATRIX MOY

| ADDRESS | BUSS ADDRESS 3 | | | BUSS ADDRESS 2 | | | BUSS ADDRESS 6 | | | BUSS ADDRESS 7 | | |
|---|---|---|---|---|---|---|---|---|---|---|---|---|
| PARITY SIGN | + | | | − | | | + | | | − | | |
| LINE ADDRESS: ADDRESS / PARITY SIGN | ADDRESS | LINE | PARITY SIGN | ADDRESS | LINE | PARITY SIGN | ADDRESS | LINE | PARITY SIGN | ADDRESS | LINE | PARITY SIGN |
| 0 + | 03 | 2 | + | 02 | 4 | − | 06 | 6 | + | 07 | 8 | − |
| 3 + | 33 | 10 | + | 32 | 12 | − | 36 | 14 | + | 37 | 16 | − |
| 5 + | 53 | 18 | + | 52 | 20 | − | 56 | 22 | + | 57 | 24 | − |
| 6 + | 63 | 26 | + | 62 | 28 | − | 66 | 30 | + | 67 | 32 | − |
| 1 − | 13 | 40 | − | 12 | 38 | + | 16 | 36 | − | 17 | 34 | + |
| 2 − | 23 | 48 | − | 22 | 46 | + | 26 | 44 | − | 27 | 42 | + |
| 4 − | 43 | 56 | − | 42 | 54 | + | 46 | 52 | − | 47 | 50 | + |
| 7 − | 73 | 64 | − | 72 | 62 | + | 76 | 60 | − | 77 | 58 | + |

TABULATION FOR SEL. MATRIX MEY

United States Patent Office 3,270,318
Patented August 30, 1966

3,270,318

ADDRESS CHECKING DEVICE

George B. Strawbridge, St. Paul, Minn., assignor to Sperry Rand Corporation, New York, N.Y., a corporation of Delaware Filed Mar. 27, 1961, Ser. No. 98,597
18 Claims. (Cl. 340—146.1)

The present invention relates to error detection devices for indicating errors in the addressing circuits of a magnetic core memory. More particularly, the present invention provides a positive checking circuit for indicating malfunction of the memory addressing circuits when the parity of the selected memory address does not compare with the parity of the address contained in or transferred to the memory address register. Furthermore, the present invention provides a positive check by indicating an error condition on any memory cycle in which the addressing circuits fail to select a memory address. The invention provides a further check by indicating an error condition on memory cycles in which both an odd parity address and an even parity address are selected.

Address checking circuits of various types are now known in the art. In one such device, an additional core memory plane is provided having a core corresponding to each address having an odd parity. If an address having an odd parity is selected, the corresponding core is switched to produce an output signal on the sense winding. This signal is compared with the parity bit of the memory address register and an error indicated if the parity is not one. Therefore, this device does not give a positive check when the parity of the address to be selected is even.

A second checking circuit now known in the art checks to insure that only one address is selected on each memory cycle. This device is not capable of indicating an error condition if the parity of the address selected does not correspond to the parity of the address applied to the memory address register.

Therefore, an object of this invention is to provide an address checking circuit that indicates an error condition on any memory cycle in which no address is selected and which indicates a second error condition if the parity of the address selected does not correspond to the parity of the address set up in the memory address register.

A further object of the invention is to provide a low cost highly reliable checking circuit for indicating that the parity of the address selected does not correspond to the parity of the address set up in the memory address register.

An object of this invention is to provide a magnetic core plane having a monitor core corresponding to each storage register within the magnetic memory and selected therewith, said cores being coupled to a single sense winding on which output signals are induced to thereby indicate that at least one storage register has been selected on a memory cycle.

A further feature of the invention is the method of assigning addresses to storage registers within a magnetic core memory array whereby monitor cores assigned to addresses having odd parities produce signals of one sense in the monitor plane sense winding and monitor cores assigned to addresses having even parities produce signals of the opposite sense in the monitor plane sense winding.

Still another feature of the invention is the provision of a magnetic core plane for a memory array, said plane having a core corresponding to each storage register of said memory array and operated therewith, a single sense winding coupled in one sense to those cores corresponding to the storage registers having an odd parity address and in the opposite sense to those cores corresponding to storage registers having an even parity address, and means responsive to signals on said output winding and to signals indicative of the parity of the address set up in the memory address register for indicating that the address selected does not correspond to the desired address.

A further feature of the invention resides in the provision of a plane of monitor cores for each memory stack or array in a data processing system. A sense winding is provided for each monitor plane and is wound so that pulses of one polarity are produced each time an even parity address is selected and pulses of the opposite polarity are produced each time an odd parity address is selected. One stage of a memory address register determines which memory stack contains the desired address and also controls the generation of timing signals to gate the output signal appearing on the sense winding of the appropriate monitor plane to a comparison circuit where the output signal is compared with a signal indicating the parity of the address applied to the memory address register.

Still another feature of this invention is the provision of a plane of monitor cores for each memory stack with each plane containing a plurality of cores corresponding to and selected with the plurality of storage registers in the stack. Each monitor plane has a single output winding and means are provided for indicating an error condition on any cycle in which the output winding associated with the selected stack does not produce a signal.

Another novel aspect of the invention lies in the provision of a circuit for producing an error signal on any memory cycle wherein the sense windings associated with the monitor planes produces signals indicating that both an odd parity address and an even parity address have been selected.

Other objects of the invention and its mode of operation will become apparent upon consideration of the following description taken in conjunction with the accompanying drawings in which:

FIGURES 4 and 5 are charts showing the assignment of octal addresses to the X and Y coordinate drive lines;

FIGURES 6 through 9 are charts showing one manner in which the matrices that drive the X and Y coordinate lines may be mechanized; and FIGURE 10 is a timing diagram illustrating the sequence in which pulses occur in the circuit of FIGURE 3.

The parity of a binary number is defined as the odd-evenness of the number of ones in the number. The parity (P) of a number (X) equals −1 and is odd (negative) if and only if the logical sum of the binary digits (M) equals 1. The parity (P) of a number (X) equals +1 and is even (positive) if and only if the logical sum of the binary digits (M) equals 0. Given a number $$X=M_1 2^0+M_2 2^1+M_3 2^2$$

then the parity of X is given by the equation $$P_X=(-1)(M_1+M_2+M_3)$$

An octal digit has a binary equivalent as expressed by the equation:

$$X8^N M_1 2^{3N}+M_2 2^{3N+1}+M_3 2^{3N+2}$$

Since the parity of X is $$P_X=(-1)(M_1+M_2+M_3)$$

then for any value of N in the preceding equation, the following table gives the binary parity of the octal digits:

*Table I*

| Octal Digit | Binary Digit | | | Parity |
|---|---|---|---|---|
| | $M_1$ | $M_2$ | $M_3$ | |
| 0 | 0 | 0 | 0 | +1 (even) |
| 1 | 1 | 0 | 0 | −1 (odd) |
| 2 | 0 | 1 | 0 | −1 |
| 3 | 1 | 1 | 0 | +1 |
| 4 | 0 | 0 | 1 | −1 |
| 5 | 1 | 0 | 1 | +1 |
| 6 | 0 | 1 | 1 | +1 |
| 7 | 1 | 1 | 1 | −1 |

The binary parity of an octal number may be determined as follows. An octal number has a binary equivalent as indicated by the equation:

$$X_0 8^0 + X_1 8^1 + X_2 8^2 \ldots X_N 8^N = M_0 2^0 + M_1 2^1 + M_2 2^2 \ldots M_{3N+2} 2^{3N+2}$$

The parity of this number is indicated by the equation:

$$P_{x_N \ldots x_2 x_1 x_0} = (-1)(M_0 + M_1 + M_2 \ldots M_{3N+2}) = (-1)(M_0 + M_1 + M_2)(-1)(M_3 + M_4 + M_5)(-1)(M_{3N} + M_{3N+1} + M_{3N+2}) = P_{x_0} P_{x_1} \ldots P_{x_N}$$

It is seen therefore that the parity of any octal number is equal to the product of the parities of the digits of that number. Table II shows the parity of two-digit octal numbers. Note that if the parity of one but not both of the digits is −1 then the parity of the number is also −1.

*Table II*

| | $P_{x_2}=-1$ | $P_{x_2}=+1$ |
|---|---|---|
| $P_{x_1}=-1$ | $P_{x_1 x_2}=+1$ | $P_{x_1 x_2}=-1$ |
| $P_{x_1}=+1$ | $P_{x_1 x_2}=-1$ | $P_{x_1 x_2}=+1$ |

The present invention will be described with reference to a 64×64 array containing 4096 addresses or storage registers and wired in the conventional coincident current manner. It should be understood, however, that the present address checking device is not limited to use with memory arrays of this specific size or type.

Figure 1:
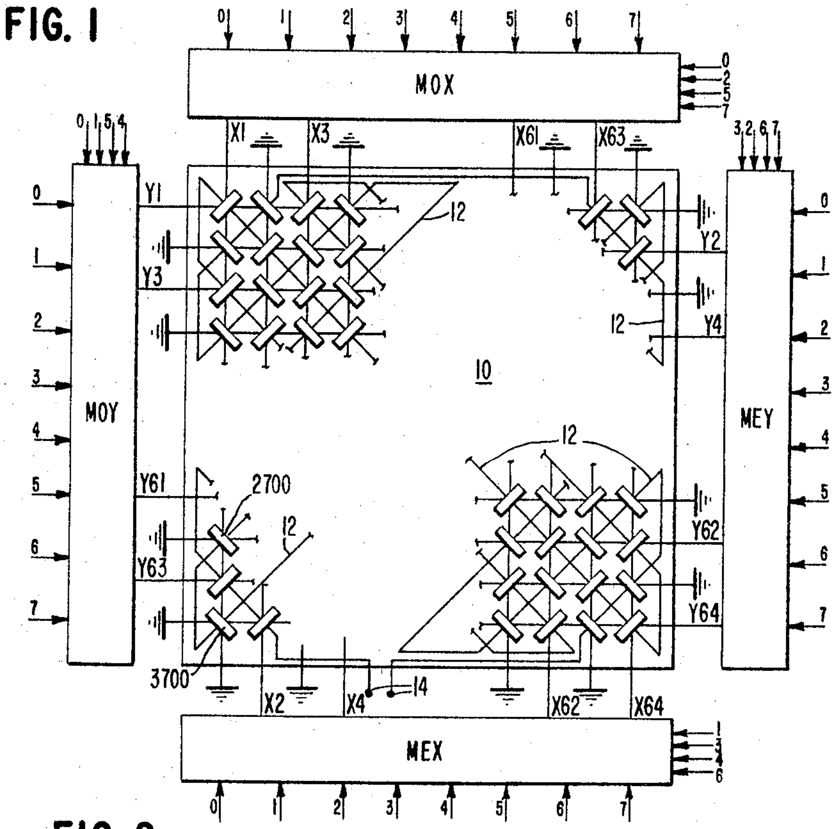
FIGURE 1 illustrates a plane of monitor cores according to the present invention.

Referring now to FIGURE 1, the address checking or monitor plane 10 comprises 4096 bistable cores, there being one core for each of the storage registers in the memory array. The core plane has sixty-four vertical columns driven by X coordinate lines $X_1$ through $X_{64}$ and sixty-four horizontal rows driven by Y coordinate drive lines $Y_1$ through $Y_{64}$. For purposes of present analysis, each core is designated as an address with each address being specified by four octal digits. Two address digits specify the Y coordinate of the address and are called the Y address. The other two address digits specify the X coordinate of the address and they are called the X address.

Coincident current memory arrays of the prior art comprise a plurality of cores arranged in a plurality of core planes. These planes are then stacked one upon the other to form the memory array or stack. The address checking or monitor plane 10 comprises an additional plane which is added to the memory stack for checking purposes. In the specific example shown, the memory array contains 4096 addresses or storage registers. It will be understood therefore that the X and Y coordinate lines shown in FIGURE 1 not only provide the coincident currents to select one of the cores of the monitor plane 10 but simultaneously therewith apply coincident currents to each of the cores in the storage register corresponding to the selected monitor core.

A sense winding 12 having output terminals 14 is coupled to each of the cores in the monitor plane, the winding coupling half of the cores in a positive sense and the other half of the cores in the negative sense. Orienting the sense winding in this manner permits maximum cancellation of the half select noise that occurs due to coincident current operation. The result of this construction is that the read-out of each core has a polarity that is determined by its coordinate lines. The following table shows the polarity pattern for core plane 10 with respect to the coordinate lines.

*Table III*

| Y Coordinate Line | X Coordinate Line | | | | | | | |
|---|---|---|---|---|---|---|---|---|
| | 1 | 2 | 3 | 4 | 5 | 6 | 7 | 8...64 |
| 1 | + | − | − | + | + | − | − | +...+ |
| 2 | + | − | − | + | + | − | − | +...+ |
| 3 | − | + | + | − | − | + | + | −...− |
| 4 | − | + | + | − | − | + | + | −...− |
| 5 | + | − | − | + | + | − | − | +...+ |
| 6 | + | − | − | + | + | − | − | +...+ |
| 7 | − | + | + | − | − | + | + | −...− |
| 8 | − | + | + | − | − | + | + | −...− |
| . | | | | | | | | |
| . | | | | | | | | |
| . | | | | | | | | |
| 64 | − | + | + | − | − | + | + | −...− |

From the foregoing discussion of the parity of octal numbers, it becomes apparent that the parity of the coordinate addresses can be assigned or selected such that the address parities will result in a pattern identical to the polarity pattern of Table III. That is, the sign of the X address parity is identical to the first row and the sign of the Y address parity is identical to the first column of the polarity pattern shown in Table III.

The polarity pattern of the resulting array is shown below.

*Table IV*

| Y coordinate line | Y address parity | 1 | 2 | 3 | 4 | 5 | 6 | 7 | ·8...64 | X coordinate line |
|---|---|---|---|---|---|---|---|---|---|---|
| | | + | − | − | + | + | − | − | +...+ | X address parity |
| 1 | + | + | − | − | + | + | − | − | +...+ | |
| 2 | + | + | − | − | + | + | − | − | +...+ | |
| 3 | − | − | + | + | − | − | + | + | −...− | |
| 4 | − | − | + | + | − | − | + | + | −...− | |
| 5 | + | + | − | − | + | + | − | − | +...+ | |
| 6 | + | + | − | − | + | + | − | − | +...+ | |
| 7 | − | − | + | + | − | − | + | + | −...− | |
| 8 | − | − | + | + | − | − | + | + | −...− | |
| . | . | . | . | . | . | . | . | . | ..... | |
| . | . | . | . | . | . | . | . | . | ..... | |
| . | . | . | . | . | . | . | . | . | ..... | |
| 64 | − | − | + | + | − | − | + | + | −...− | |

Turning again to FIGURE 1, the odd numbered X coordinate drive lines enter the code plane from the top and are driven by a 4×8 diode-transformer matrix MOX which generates the odd X addresses. The even X coordinate drive lines enter the core plane from the bottom and are driven by a 4×8 diode-transformer matrix MEX which generates the even X addresses.

In like manner, matrix MOY generates the odd Y addresses and drives the odd Y coordinate drive lines and the matrix MEY generates the even Y addresses and drives the even Y coordinate drive lines.

The addresses of the cores in monitor plane 10 are randomly assigned but must meet the requirement that the polarity of the signal induced in sense winding 12 as the core is selected corresponds to to the polarity of the parity of the address assigned to that core. One method of achieving this result is illustrated by the charts shown in FIGURES 4 through 9, but before proceeding further with the analysis consideration should be given to a portion of the circuit shown in FIGURE 2.

Figure 2:
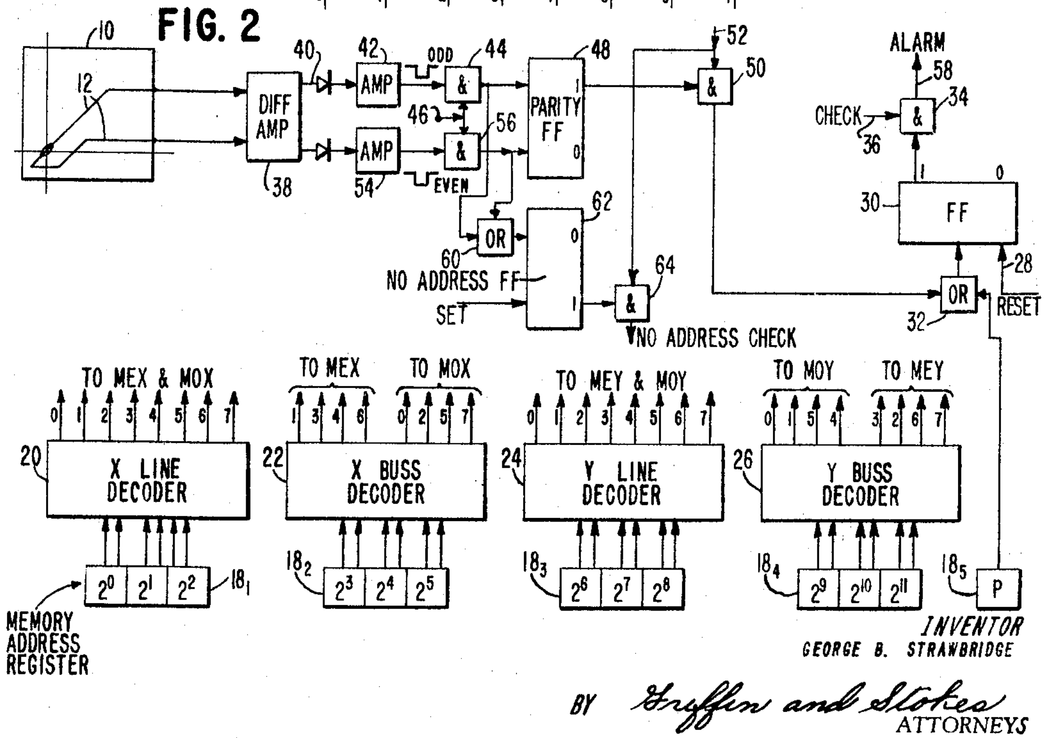
FIGURE 2 shows the addressing circuits and also the circuits for comparing the parity of the memory address register with the parity of the seleceted storage register.

The Memory Address Register has twelve binary stages for storing twelve binary digits indicating the address to be selected. The twelve binary stages are shown in FIGURE 2 as being divided into four octal groups of three stages each for the purpose of clarity. Each group of three stages stores one octal digit of the address. Octal digit $18_1$ is the low order digit of the address and octal digit $18_4$ is the high order digit of the address.

The signals representing octal digit $18_1$ are fed to the X line decoder 20 which produces an output signal on one of the eight output lines 0 through 7. The output leads from the X line decoder are connected to both the MEX and MOX matrices. The signals representing octal digit $18_2$ are fed to the X buss decoder 22 where they are decoded to produce an output signal on one of eight output lines. The output lines energized if the octal digit $18_2$ is a 1, 3, 4, or 6 are connected to the even X address matrix MEX. The output lines energized if the octal digit $18_2$ is 0, 2, 5, or 7 are connected to the odd X address matrix MOX.

The signals representing octal digit $18_3$ are decoded in the Y line decoder 24 to produce an output signal on one of the eight output lines. These output lines are connected to both the even and odd Y address matrices MEY and MOY.

Octal digit $18_4$ is decoded in the Y buss decoder 26. The decoder output lines energized if digit $18_4$ is a 0, 1, 5, or 4 are connected to the odd Y address matrix MOY and the decoder output lines energized if digit $18_4$ is a 3, 2, 6 or 7 are connected to the even Y address matrix MEY.

As stated before, the addresses are randomly assigned to the cores of the monitor plane under the restriction that the polarity of the parity of the assigned address corresponds to the polarity of the signal induced in the sense winding as the monitor core is selected. To accomplish this end result, the following procedure may be used. Two-digit addresses are assigned to each of the sixty-four X coordinate lines such that the polarity pattern of the parity of the assigned addresses corrseponds to the pattern of the first row in Table IV. Next, addresses are assigned to each of the Y coordinate drive lines such that the polarity pattern of the parity of the assigned addresses corrseponds to the pattern of the first column of Table IV. FIGURE 4 shows one possible assignment of addresses to each of the sixty-four X coordinate lines while FIGURE 5 shows one possible assignment of addresses to each of the sixty-four Y coordinate lines.

Having assigned addresses to the X and Y coordinate lines, the remaining factor to be determined is the mechanization of the matrices MEX, MOX, MEY, and MOY.

It was noted above that each X coordinate and each Y coordinate line is designated by a two-digit address. As shown in FIGURE 4, coordinate line $X_1$ issues from selection matrix MOX and is assigned the address 00. This address has a positive parity so it is required that the selection matrix MOX be mechanized such that the two octal digits energizing MOX to produce an output of coordinate line $X_1$ also have a positive parity. As shown in FIGURE 7, coordinate line $X_1$ having the address 00 is energized if the line address digit is 0 and the buss address digit is 0. Note that the parity of 0 is positive therefore the parity of the address 00 is also positive.

Figures 9, 10:
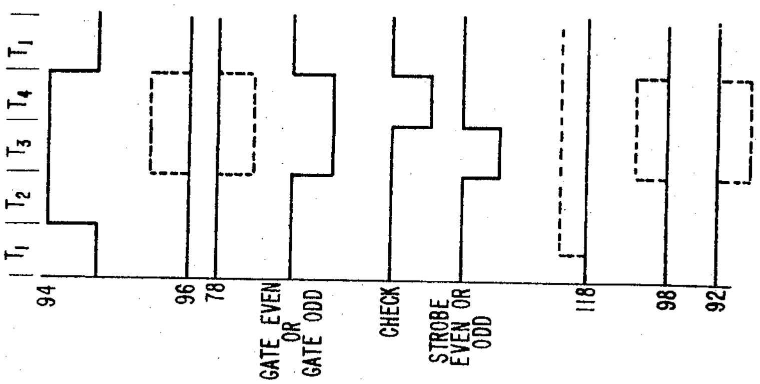

As another example consider the mechanization of matrix MEY. As shown in FIGURE 5, coordinate line $Y_{64}$ is assigned the address 73 having a negative parity. It is necessary therefore that the octal digits $18_3$ and $18_4$ which cause the selection of coordinate line $Y_{64}$ also have a negative parity. As shown in FIGURE 9, $Y_{64}$ is selected if the line address digit $18_3$ is a 7 and the buss address digit $18_4$ is a 3. Since the parity of 7 is minus and the parity of 3 is plus, the parity of the two digit octal number 73 is minus and meets the required conditions.

Further illustrations of the mechanization of the selection matrices MEX, MOX, MEY and MOY are deemed unnecessary since it should be apparent to one skilled in the art how the matrices may be constructed utilizing the information tabulated in FIGURES 4 through 9.

Combining the two examples above assume that the binary value 000 000 111 110 corresponding to the octal value 0073 (least significant digit first) is entered into the Memory Address Register. The parity of address 3700 is negative so that parity stage $18_5$ is set and produces a negative output signal.

At the beginning of each memory cycle, a pulse on line 28 resets the flip-flop 30 to its off condition. As an address is entered into the Memory Address Register, its parity is entered into the parity stage. If the parity of the address is negative (odd), the parity stage will produce a negative output pulse which passes through OR gate 32 to complement the setting of the flip-flop. This conditions one input of AND gate 34, but an alarm is not produced at this time due to the absence of a signal on the line 36. The number in the Memory Address Register is now decoded in the X and Y line decoders to produce line address signals 0 and 7 while the X and Y buss decoders produce buss address signals 0 and 3 respectively. These signals are applied to the matrices MEX, MOX, MEY and MOY. Since MEX and MOY receive no buss address signals, they are inactive. MOX energizes $X_1$ at the same time MEY energizes $Y_{64}$. The coincident currents on $X_1$ and $Y_{64}$ select the word register having address 3700 and at the same time drive the monitor core 3700 from the one state to the zero state. At this point, it should be noted that all monitor cores are initially set to the one state by means of an inhibit winding which is not shown.

The core 3700 which is switched from the one state to the zero state induces an output current on winding 12. For purposes of explanation, the direction of the current induced in winding 12 as core 3700 is switched from one to zero is defined as negative and agrees with the polarity of the parity of the number 3700.

Both ends of sense winding 12 are connected to the input of differential amplifier 38. Since the parity of the address selected is negative, an output signal is produced on line 40 by the differential amplifier. This signal is amplified by class C amplifier 42, and applied to one input of AND gate 44. The timing pulse applied to terminal 46 strobes AND gate 44 and produces a signal to set the parity flip-flop 48 to its one state. This conditions one input of the two input AND gate 50. A short time interval later, a pulse is applied by way of the terminal 52 to AND gate 50 which in turn produces a signal that passes through OR gate 32 to complement the setting of the flip-flop 30. It will be remembered that the parity stage of the Memory Address Register contained an indication of a negative parity address and set the flip-flop 30 to its one state at the beginning of the cycle. Thus, the output of AND gate 50 resets the flip-flop 30 to its zero state, thereby deconditioning one input to the AND gate 34. As a result, the check pulse applied over line 36 cannot pass through the AND gate 34 to produce an alarm signal.

Consider the case where there is a malfunction of the addressing circuits so that address 2700, having an even parity, is selected although the value 3700 is applied to the Memory Address Register. This might occur if stage $2^9$ of the Memory Address Register should fail to register a binary one as the address is transferred to it.

The parity of 3700 is odd or negative so that the parity stage $18_5$ again produces a signal to set the flip-flop 30 and condition AND gate 34. The zeros in octal stages $18_1$ and $18_2$ are decoded to produce zero X line and zero X buss address signals. These signals are decoded in matrix MOX and drive coordinate line $X_1$.

The 7 in octal stage $18_3$ is decoded to produce a Y line address of 7 and the 2 in octal stage $18_4$ is decoded to produce a Y buss address of 2. These signals are decoded in matrix MEY and as shown in FIGURE 9, drive coordinate line $Y_{62}$.

Coincident energization of coordinate lines $X_1$ and $Y_{62}$ selects the storage register having the address 2700 and simultaneously therewith drives monitor core 2700 from the one state to the zero state. Note, however, that the sense winding 12 is coupled to core 2700 in the opposite sense to the way in which it is coupled to core 3700 hence a positive signal is induced in the sense winding as the core changes state. This signal is amplified by differential amplifier 38 and amplifier 54 and applied to AND gate 56. The timing signal applied at terminal 46 now passes through AND gate 56 to set the parity flip-flop to its zero state. When the timing is applied to AND gate 50 it is blocked and cannot reset the flip-flop 30. Therefore, at the end of the memory cycle the check pulse 36 passes through AND gate 34 to operate an alarm.

It is obvious therefore that the present invention produces an alarm signal 58 on each memory cycle in which the parity of the selected address does not correspond to the parity of the desired address.

The present invention also provides means for indicating an error condition or malfunction of the addressing system if, on any active memory cycle, no memory address is selected. The No Address check is provided by OR gate 60, the No Address flip-flop 62 and AND gate 64.

The No Address flip-flop 62 is normally set to its one state at the beginning of each memory cycle and conditions one input of AND gate 64. Toward the end of each memory cycle a pulse is applied at terminal 52 which passes through AND gate 64 to indicate that no memory storage register was selected.

On any memory cycle in which a memory storage register is selected, an output signal will be produced by either AND gate 44 or AND gate 56 in the manner described above. These outputs pass through OR gate 60 and are applied to the No Address flip-flop and set it to its zero state. Therefore, when the pulse is applied at terminal 52, the AND gate 64 is not conditioned by an output from the flip-flop 62 and blocks the No Address error signal.

Figure 3:
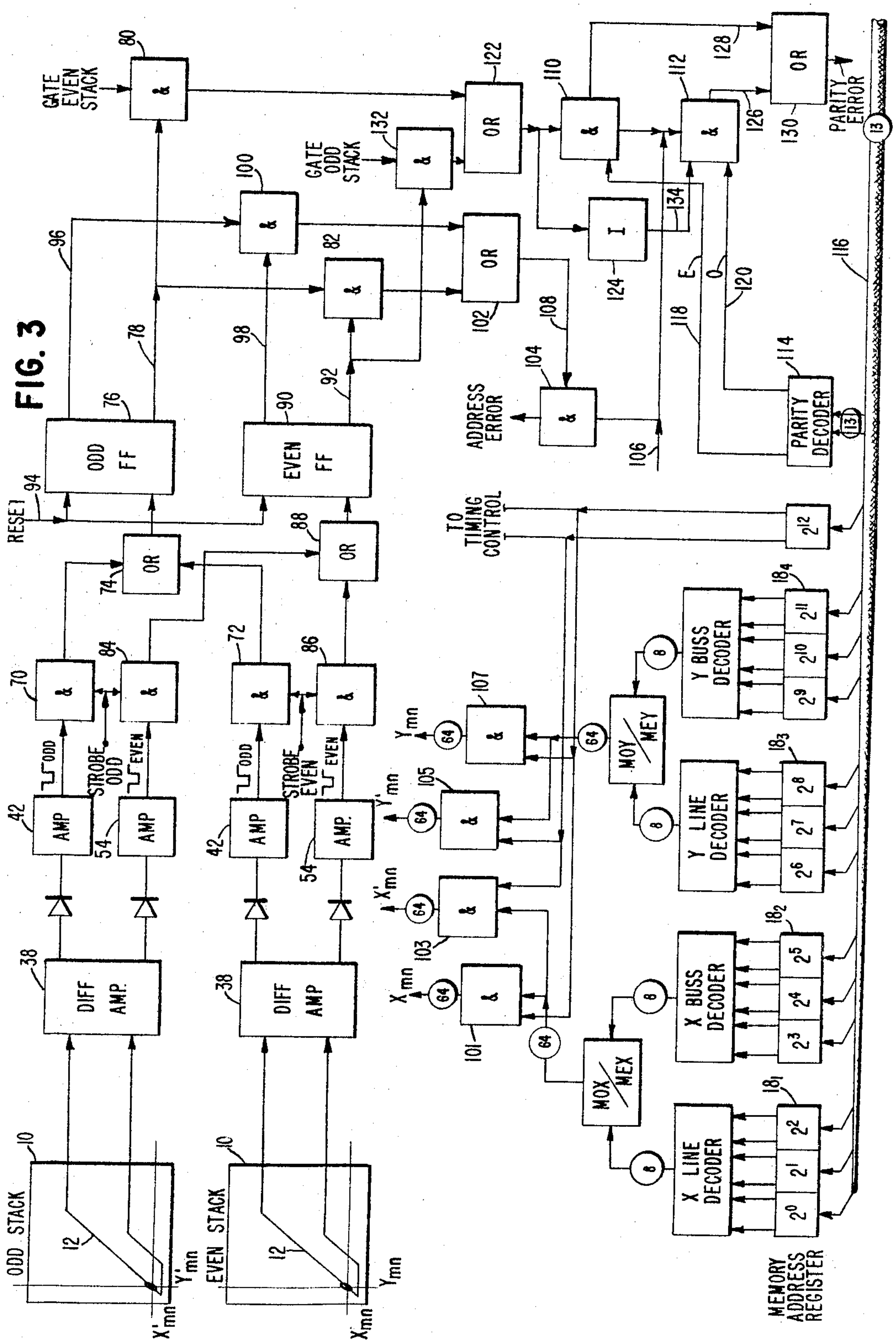
FIGURE 3 is an alternative embodiment of the invention including means for checking the address selection in either of two core memory arrays.

The embodiment of FIGURE 3 illustrates the manner in which the present invention may be adapted to check the address selection circuits of a memory where the memory comprises two separate stacks of core planes. Assuming that each of the stacks comprises 4096 addresses, the total capacity of the memory is 8192 words. In the binary system it requires thirteen digits to represent the decimal value 8192 so the Memory Address Register is provided with an additional binary stage $2^{12}$.

The Memory Address Register stages $2^0$ through $2^{11}$ provide output signals which are decoded in the X line, X buss, Y line, Y buss, MEX, MOX, MEY and MOY decoders in the same manner as the embodiment of FIGURES 1 and 2. The stages $2^0$ through $2^{11}$ define the stack address. Each stack contains addresses $0000_8$ to $7777_8$.

The sixty-four output lines from MEX and MOX are connected in parallel to two groups of sixty-four AND gates designated 101 and 103. The sixty-four output lines from MEY and MOY are connected in parallel to two groups of sixty-four AND gates designed 105 and 107. If stage $2^{12}$ of the Memory Address register contains a binary one, the gates 103 and 105 are conditioned so that the X and Y coordinate drive signals are applied to the odd stack. On the other hand, if stage $2^{12}$ of the Memory Address Register contains a binary zero, the gates 101 and 107 are conditioned so that the X and Y coordiate drive signals are applied to the even stack.

Stage $2^{12}$ of the Memory Address Register also controls the gating of certain timing pulses generated by the timing controls (not shown). If stage $2^{12}$ contains a binary one, it permits the Odd Strobe and Gate Odd Stack signals to be applied to the AND gates 70 and 84 and the AND gate 132. FIGURE 10 shows that the Strobe Odd signal is generated during $T_3$ while the Gate Odd Stack signal is generated during $T_3$ and $T_4$.

If stage $2^{12}$ of the Memory Address Register contains a zero then the Even Strobe signal is applied to AND gates 72 and 86 during $T_3$ and the Gate Even Stack signal is applied to AND gate 80 during $T_3$ and $T_4$.

Each memory array or stack is provided with an additional monitor plane 19 similar to that shown in FIGURE 1. Each monitor plane has a single sense winding 12, a differential amplifier 38, and a pair of class C amplifiers 42 and 54 connected in the manner described with reference to FIGURES 1 and 2.

The amplifier 42 on the output of the odd stack produces a negative output signal each time a stack address having an odd parity is selected in the odd stack. This output signal conditions one input of AND gate 70, the other input of which receives a strobe pulse on each memory cycle in which the Memory Address Register stage $2^{12}$ is set to the one state. In like manner, amplifier 42 connected to the output of the even stack produces a negative output signal each time a stack address having an odd parity is selected in the even stack. This signal conditions one input of AND gate 72, the other input of which receives a timing pulse on each memory cycle in which the Memory Address Register stage $2^{12}$ is set to zero. AND gates 70 and 72 are connected to inputs of OR gate 74 the output of which sets the Odd flip-flop 76 to thereby produce an output pulse on the lead 78 to condition one input of AND gates 80 and 82.

The amplifier 84 connected to the output of the odd stack produces a negative output signal each time a stack address having an even parity is selected in the odd stack. This signal conditions one input of AND gate 84 which also receives the Odd Strobe signal. Amplifier 54 connected to the output of the even stack produces a negative output signal each time a stack address having an even parity is selected in the even stack. This signal conditions one input of AND gate 86 which also receives the Even strobe signal.

AND gates 84 and 86 are connected through OR gate 88 to set the Even flip-flop 90 thereby producing an output signal on the lead 92 to condition one input of AND gates 82 and 132.

Referring to the timing diagram of FIGURE 10, the Even and Odd flip-flops are reset during $T_1$ of each memory cycle by the application of a negative pulse over lead 94. This produces negative voltages on the output lines 96 and 98 thereby conditioning AND gate 100. The output of AND gate 100 passes through OR gate 102 and is applied to one input of AND gate 104. A negative check pulse is applied over lead 106 during interval $T_4$ of each memory cycle and this pulse passes through AND gate 104 to produce an address error indication provided the AND gate 100 is conditioned. However, in normal operation of the memory addressing circuits without an error, either the Odd flip-flop or the Even flip-flop is set during the memory cycle. If a stack address having an odd parity is selected, the Odd flip-flop is set and if a stack address having an even parity is selected, the Even flip-flop is set. If either one of the flip-flops is set during given memory cycle, the conditioning voltage applied to one of the inputs of AND gate 100 will be removed. Therefore, assuming that the memory addressing circuits did not make an error by failing to select any address, the input 108 to AND circuit 104 will be deconditioned during $T_4$ of the memory cyle and the check pulse cannot pass through the AND gate to produce an address error indication.

The circuit of FIGURE 3 indicates an error condition if a stack address having even parity and a stack address having odd parity are both selected on a single memory cycle. Under this condition, both the Odd flip-flop and the Even flip-flop are set, thereby producing negative output voltages on lines 78 and 92. This conditions AND gate 82 thereby producing an output signal which passes through OR gate 102 to condition one input of the AND gate 104. During $T_4$ of the memory cycle, the check pulse on line 106 passes through AND gate 104 to produce the address error signal.

AND gates 110 and 112 serve to compare the total parity of the selected address with the total parity of the address which is, or should be, transferred to the Memory Address Register. As will become clear from the following discussion, the output of OR gate 122 is positive if the total parity of the selected address is even and is negative if the total parity of the selected address is odd. The parity decoder 114 and the Memory Address Register are connected in parallel to the transfer buss 116. This decoder receives the 13 bits representing the address to be selected and determines the oddness or evenness of the parity. The parity decoder produces a negative output signal on lead 118 if the parity of the address entered into stages $2^0$ through $2^{12}$ of the Memory Address Register is even and a negative output signal on lead 120 if the parity of the address entered therein is odd. Thus, AND gates 110 and 112 compare the signal indicating of polarity of the total parity of the selected address with the signal indicating the polarity of the total parity of the desired address and indicate an error condition if the two parities are not equal.

The mode of operation of this embodiment of the invention may be better understood by considering the following examples:

*Example 1.*—Assume that a stack address having an even parity has been entered into Memory Address Register stages $2^0$ through $2^{11}$ and that stage $2^{12}$ contains a one indicating that the address is in the odd stack. Note that although the parity of stages $2^0$ through $2^{11}$ is even, the parity of stage $2^{12}$ is odd hence the total parity of the Memory Address Register is odd. The parity decoder 114 determines the total parity of the address as it is entered into the Memory Address Register and produces a negative voltage on lead 120 and a positive voltage on lead 118. Assuming that the correct address is selected, a negative signal appears at the output of odd stack amplifier 54 and is applied to AND gate 84 beginning at some time before interval $T_3$ and ending slightly after $T_3$. The presence of a one bit in stage $2^{12}$ of the Memory Address Register has conditioned the timing control circuits of the memory system to produce the Odd Strobe signal during the time interval $T_3$ thereby sampling the output of amplifier 54. The Odd Strobe signal passes through AND gate 84 and OR gate 88 to set the Even flip-flop 90. Since the presence of a one in the $2^{12}$ stage of the Memory Address Register causes the Gate Odd Stack signal to be produced, the AND gate 132 passes the negative output signal appearing on lead 92. As a result, the output of AND gate 132 and OR gate 122 are negative and condition one input of AND gate 110. The AND gate is blocked at this time by the positive signal on lead 118.

The output of OR gate 122 is inverted in inverter 124 and applies a positive voltage to one input of the AND gate 112. During the time interval $T_4$, the negative check pulse on line 106 is applied to the second input of AND gate 112 which is blocked by the positive output from the inverter. Since both AND gates 110 and 112 are blocked during the time interval $T_4$, positive voltage levels exist on leads 126 and 128 thereby causing the output of OR circuit 130 to be positive. A positive output from this OR circuit indicates that the total parity of the selected address is equal to the total parity of the address set up in Memory Address Register.

*Example 2.*—Assume that the stack address entered into Memory Address Register stages $2^0$ through $2^{11}$ has an even parity and stage $2^{12}$ contains a zero indicating that the address is to be selected from the even stack. Since the parity of zero is even the total parity of stages $2^0$ through $2^{12}$ is even. The parity decoder produces a negative signal on line 118 and a positive signal on lead 120 to indicate that the total parity of the address in the Memory Address Register is even. The zero in the 12th stage of the Memory Address Register conditions the timing control circuits so that the Strobe Even pulse is produced during the time interval $T_3$ and the Gate Even Stack pulse is produced during the time interval $T_3T_4$. Assuming the address specified by the Memory Address Register is selected in the even stack, the amplifier 54 produces a negative output signal which conditions the AND gate 86 to pass the Strobe Even pulse. This signal passes through OR gate 88 to set the Even flip-flop 90 thereby producing a negative voltage on lead 92 and a positive voltage on lead 98. The signal on line 92 is applied to the AND gate 132 but is blocked at this point since the Gate Odd Stack signal is not produced on this memory cycle. As a result, a positive signal from OR gate 122 blocks AND gate 110 while the inverted output of OR gate 122 is applied to AND gate 112 over the lead 134. The second input to AND gate 112 is conditioned during the time interval $T_4$ by the negative check pulse applied on lead 106. However, AND gate 112 is blocked at this time because of the positive output voltage applied to the input lead 120 by the parity decoder.

*Example 3.*—Assume that the stack address entered into the Memory Address Register stages $2^0$ through $2^{11}$ has an odd parity and is contained in the even stack as indicated by a zero in stage $2^{12}$ of the register. Since the total parity of this address is odd, the parity decoder produces a negative signal on lead 120 and a positive signal on lead 118. Assume further that the stack address actually selected in the even stack has an even parity rather than an odd parity. The amplifier 54 produces a negative output pulse which is gated through the AND gate 86 by the Strobe Even pulse and is applied to the Even flip-flop through OR gate 88. The negative signal produced on lead 92 is blocked at the AND gate 132 because of the absence of the Gate Odd Stack signal. As noted before, this signal is produced only on those memory cycles where stage $2^{12}$ contains a one. The positive output of AND gate 132 causes a positive signal to be applied to the AND gate 110 thereby blocking this gate and at the same time causes a negative signal from the inverter 124 to be applied to AND gate 112. Since the lead 134 is negative and the output on lead 120 from the decoder is negative, the negative check pulse appearing on lead 106 during the time interval $T_4$ passes through AND gate 112 and OR gate 130 to indicate that the partity of the address applied to the Memory Address Register does not compare with the parity of the address actually selected.

*Example 4.*—As a further example, consider the case where the stack address entered into stages $2^0$ through $2^{11}$ the Memory Address Register has an even parity and is contained in the odd stack as indicated by a one in stage $2^{12}$. The total parity is odd causing the decoder 114 to produce a negative signal on lead 120 and a positive signal on lead 118. Assume now that the stack address actually selected in the odd stack has an odd parity rather than the desired even parity. The amplifier 42 produces a negative output signal which is gated through AND gate 70 by the Strobe Odd Pulse is set the Odd flip-flop 76. The negative output signal appearing on lead 78 is blocked by the gate 80 since the one in stage $2^{12}$ of the Memory Register has caused the timing control circuits to produce the Gate Odd Stack signal. The positive output from gate 80 passes through OR gate 122 and is applied to AND gate 110, which is blocked. The output of the OR gate is inverted and applied to one input of AND gate 112. The signal on lead 120 is also negative because the parity of the address in the Memory Address Register is odd. As a result, the negative check pulse applied over lead 106 during the time interval $T_4$ passes through AND gate 110 and the OR gate 130 to produce a parity error signal.

The examples given above should make the mode of operation of the present invention clear to those skilled in the art and further examples are considered unnecessary. The foregoing description has assumed the use of AND gates which are responsive to negative input signals simultaneously applied to all inputs for producing negative output signals. The foregoing description has also assumed the use of OR circuits and flip-flops which are responsive to negative inut signals. However, the present invention is not limited to circuits of this type, but may for example employ logical AND circuits responsive to positive input signals for producing positive output signals. Many circuits of both types are disclosed in the prior art.

While the novel features of the invention as applied to preferred embodiments have been shown and described, it will be obvious that various omissions and substitutions in the form and details of the devices illustrated may be made without departing from the spirit and scope of the invention. It is intended therefore to be limited only by the scope of the appended claims.

I claim:

1. An address checking means for use in a magnetic core memory system having addressing means whereby data storage addresses within a core array may be selected in response to signals produced by an address register, said address checking means comprising: a plurality of cores there being one different core corresponding to each of said addresses; means responsive to signals produced by said address register for selecting one of said cores only when the data storage address corresponding thereto is selected; and an output winding coupled to each of said cores, said output winding being coupled in one sense to those cores corresponding to data storage addresses having an odd parity and in the opposite sense to those cores corresponding to data storage addresses having an even parity, whereby the polarity of the signal induced in said output winding indicates the parity of the selected address.

2. An address checking means as claimed in claim 1 and further comprising means for indicating the parity of the address in said address register; and means responsive to said address register parity indicating means and the signal in said output winding for indicating that the parity of the selected address does not equal the parity of the address applied to said address register.

3. An address checking means as claimed in claim 1, and further comprising means for normally indicating that no address was selected on a memory selection cycle, said means being connected to said output winding and rendered inactive by signals of either sense induced thereon when said cores are selected.

4. The combination comprising: a magnetic core memory device having a plurality of addressable word registers therein; a plurality of monitor cores, each monitor core corresponding to one of said word registers and normally addressed only when its corresponding word register is addressed; sense winding means coupled to all of said monitor cores; means normally indicating that a word register was not selected on a memory cycle, said means being connected to said sense winding means and inhibited by signals appearing thereon when one of said monitor cores is addressed; and means normally operative on each memory cycle to address only one of said word registers and its corresponding monitor core.

5. The combination as claimed in claim 4 wherein said sense winding means comprises a conductor coupled in one sense to those monitor cores having addresses of one parity and coupled in the opposite sense to those monitor cores having addresses of the opposite parity; and means for sensing the polarity of signals produced on said sense winding means to thereby indicate the parity of the selected address.

6. In combination: a magnetic core memory comprising a plurality of addressable word registers; a plurality of magnetic cores there being one different core corresponding to each of said word registers; means for producing signals representative of the address of a word register to be selected; means responsive to said last named means for selecting a word register and switching only the core corresponding thereto; and an output winding, said output winding being coupled in one sense to those cores corresponding to word registers selected in response to signals representative of an address having a positive parity and in the opposite sense to those cores corresponding to word registers selected in response to signals representative of an address having a negative polarity, whereby the polarity of the signal induced in said output winding indicates the parity of the address of the selected word register.

7. The combination as claimed in 6, and further comprising; means to indicate the parity of the address of a word register to be selected; and means responsive to said parity indication and the signal on said output winding for indicating that the word register selected does not correspond to the word register which should have been selected.

8. The combination as claimed in claim 6 and further comprising means for normally indicating that no word register was selected, said means being connected to said output winding and rendered inactive by signals of either sense induced thereon as said cores are selected.

9. In a magnetic core memory system having means for selecting a desired address from either one of two memory stacks in response to signals set up in a memory address register, the improvement comprising: a monitor plane for each of said stacks; a plurality of cores in each of said planes, there being one different core for each of said addresses and selectable therewith; sense winding means for each of said monitor planes, said sense winding means being coupled in one sense to those monitor cores corresponding to addresses having an even parity and in the opposite sense to those monitor cores corresponding to addresses having an odd parity; and means responsive to the signals produced in said sense winding means as said monitor cores are selected for indicating the parity of the address of the selected core.

10. In a magnetic core memory system having means for selecting a desired address from either one of two memory stacks in response to signals set up in a memory address register, the improvement comprising: a monitor plane for each of said stacks; a plurality of cores in each of said planes, there being one different core for each of said addresses and selectable therewith; a sense winding for each of said monitor planes, said sense windings being coupled in one sense to those monitor cores corresponding to addresses having an even parity and in the opposite sense to those monitor cores corresponding to addresses having an odd parity; and means responsive to the signals produced in said sense windings as said monitor cores are selected for indicating that an address having an odd parity and an address having an even parity are selected on the same memory cycle.

11. In a magnetic core memory system having means for selecting a desired address from either one of two memory stacks in response to signals set up in a memory address register, the improvement comprising: a monitor plane for each of said stacks; a plurality of cores in each of said planes, there being one different core for each of said addresses and selectable therewith; a sense winding for each of said monitor planes, said sense windings being coupled in one sense to those monitor cores corresponding to addresses having an even parity and in the opposite sense to those monitor cores corresponding to addresses having an odd parity; and means responsive to the absence of signals in said sense windings for indicating that a memory cycle has occurred in which no address was selected.

12. In a magnetic core memory system having means for selecting a desired address from either one of two memory stacks in response to signals set up in a memory address register and also having means for indicating the parity of the address applied to said memory address register, the improvement comprising: a monitor plane for each of said stacks; a plurality of cores in each of said planes, there being one different core for each of said addresses and selectable therewith; a sense winding for each of said monitor planes, said sense windings being coupled in one sense to those monitor cores corresponding to addresses having an even parity and in the opposite sense to those monitor cores corresponding to addresses having an odd parity; and means responsive to the signals produced in said sense windings and said indication of the parity of the address applied to said memory address register for indicating that the parity of the selected address does not correspond to the parity of the desired address.

13. The combination comprising: a magnetic core memory comprising first and second memory stacks each having a plurality of selectable addresses therein, a monitor plane for each of said stacks; a plurality of cores in each of said planes, there being one different core for each of said addresses and selectable therewith; first means responsive to applied signals for producing stack address signals; second means responsive to applied signals for indicating whether said stack address signals are to be applied to said first or said second memory stack; means for applying a total address to said first and said second means; means responsive to said first means and said second means for selecting an address in one of said stacks; a sense winding for each of said monitor planes, said sense windings being coupled in one sense to those cores corresponding to stack addresses having an odd parity and in the opposite sense to those cores corresponding to stack addresses having an even parity; and means responsive to signals on said sense windings for indicating the parity of the stack address selected.

14. The combination as claimed in claim 13 and further comprising: means for indicating the parity of the total address applied to said first means and said second means; means responsive to said second means and to said indication of the parity of the stack address selected for indicating the total parity of the selected address; and comparing means for producing an error signal when the total parity of the selected address does not correspond to the total parity of the address applied to said first means and said second means.

15. The combination as claimed in claim 13 wherein the polarity of the signals induced on said sense windings as said monitor cores are selected indicate the parity of the stack address selected.

16. An address checking means as claimed in claim 1 and further comprising: first gating means connected to said output winding and responsive to signals of one polarity therein; second gating means connected to said output winding and responsive to signals of the opposite polarity induced therein; a bistable device; means for setting said bistable device to a first state on each memory cycle; means for applying output signals from said first and second gating means to said bistable device to set it to a second stable state; and means for sensing the state of said bistable device to thereby produce an error signal on a memory cycle in which neither said first nor said second gating means produces an output signal.

17. An address checking means as claimed in claim 16 and further comprising: means for indicating the parity of the address in said address register; a second bistable device connected to said first and second gating means for storing an indication of the parity of the selected address; and means connected to said parity indicating means and said second bistable device for producing an error signal when said parities are not equal.

18. The combination comprising:

an addressable memory stack having a plurality of planes, each of said planes having a plurality of rows and columns of magnetic cores, first addressing means for selectively producing a first plurality of selection signals at a first plurality of outputs;

second addressing means for selectively producing a second plurality of selection signals at a second plurality of outputs;

a plurality of column drive line means, each of said column drive line means threading the cores in a corresponding column in each of said planes and responsive to one of said first plurality of outputs;

a plurality of row drive line means, each of said row drive line means threading the cores in a corresponding row in each of said planes and responsive to one of said second plurality of outputs, whereby a word register having a unique address is comprised of the correspondingly positioned core in each plane;

output winding means coupled to all the cores in one of said planes, said winding means being coupled in one sense to those cores in addresses having odd parity and in the opposite sense to those cores in addresses having an even parity;

address register means for applying addressing signals to said first and second addressing means;

means for indicating the parity of the address represented by said addressing signals;

and error indicating means responsive to said parity indicating means and said output winding means.

References Cited by the Examiner

UNITED STATES PATENTS

| | | | |
|---|---|---|---|
| 2,904,781 | 9/1959 | Katz | 340—174 |
| 3,122,724 | 2/1964 | Felton et al. | 340—174 |
| 3,157,860 | 11/1964 | Batley | 340—174 |

MALCOLM A. MORRISON, *Primary Examiner.*

IRVING SRAGOW, ROBERT C. BAILEY, *Examiners.*

R. J. McCLOSKEY, M. P. ALLEN, M. SPIVAK, *Assistant Examiners.*

UNITED STATES PATENT OFFICE
CERTIFICATE OF CORRECTION

Patent No. 3,270,318 August 30, 1966

George B. Strawbridge

It is hereby certified that error appears in the above numbered patent requiring correction and that the said Letters Patent should read as corrected below.

Column 1, lines 35 and 36, for "memmory" read -- memory --; column 2, line 43, for "selecected" read -- selected --; column 2, lines 65 and 72, the equation, each occurrence, should appear as shown below instead of as in the patent:

$$P_X=(-1)^{(M_1+M_2+M_3)}$$

column 3, line 24, the equation should appear as shown below instead of as in the patent:

$$P_{X_N-----X_2X_1X_0}=(-1)^{(M_0+M_1+M_2---M_{3N+2})}$$

lines 25 and 26, for "$=(-1)(M_0+M_1+M_2)(-1)(M_3+M_4+M_5)$" read -- $=(-1)^{(M_0+M_1+M_2)}(-1)^{(M_3+M_4+M_5)}$ --; line 26, for "$(-1)(M_{3N}+M_{3N+1}+M_{3N+2})$" read -- $(-1)^{(M_{3N}+M_{3N+1}+M_{3N+2})}$ --; line 54, for "$X_1$ through $X_{64}$" read -- X1 through X64 --; line 74, for "$Y_1$ through $Y_{64}$" read -- Y1 through Y64 --; column 4, line 74, for "code" read -- core --; column 5, line 59, for "corrseponds" read -- corresponds --; column 6, lines 1, 2, 42, and 43, and column 7, lines 12 and 18, for "$X_1$", each occurrence, read -- X1 --; column 6, lines 8, 10, 11, 43 and 44, for "$Y_{64}$", each occurrence, read -- Y64 --; column 7, lines 17 and 18, for "$Y_{62}$", each occurrence, read -- Y62 --; column 8, line 8, for "coordiate" read -- coordinate --; column 11, line 5, after "Memory" insert -- Address --; line 24, for "inut" read -- input --.

Signed and sealed this 5th day of September 1967.

(SEAL)
Attest:

ERNEST W. SWIDER
Attesting Officer

EDWARD J. BRENNER
Commissioner of Patents